March 12, 1968  A. K. SHONE  3,372,719
CIRCULAR SAW AND INSERT TOOTH THEREFOR
Filed July 7, 1966
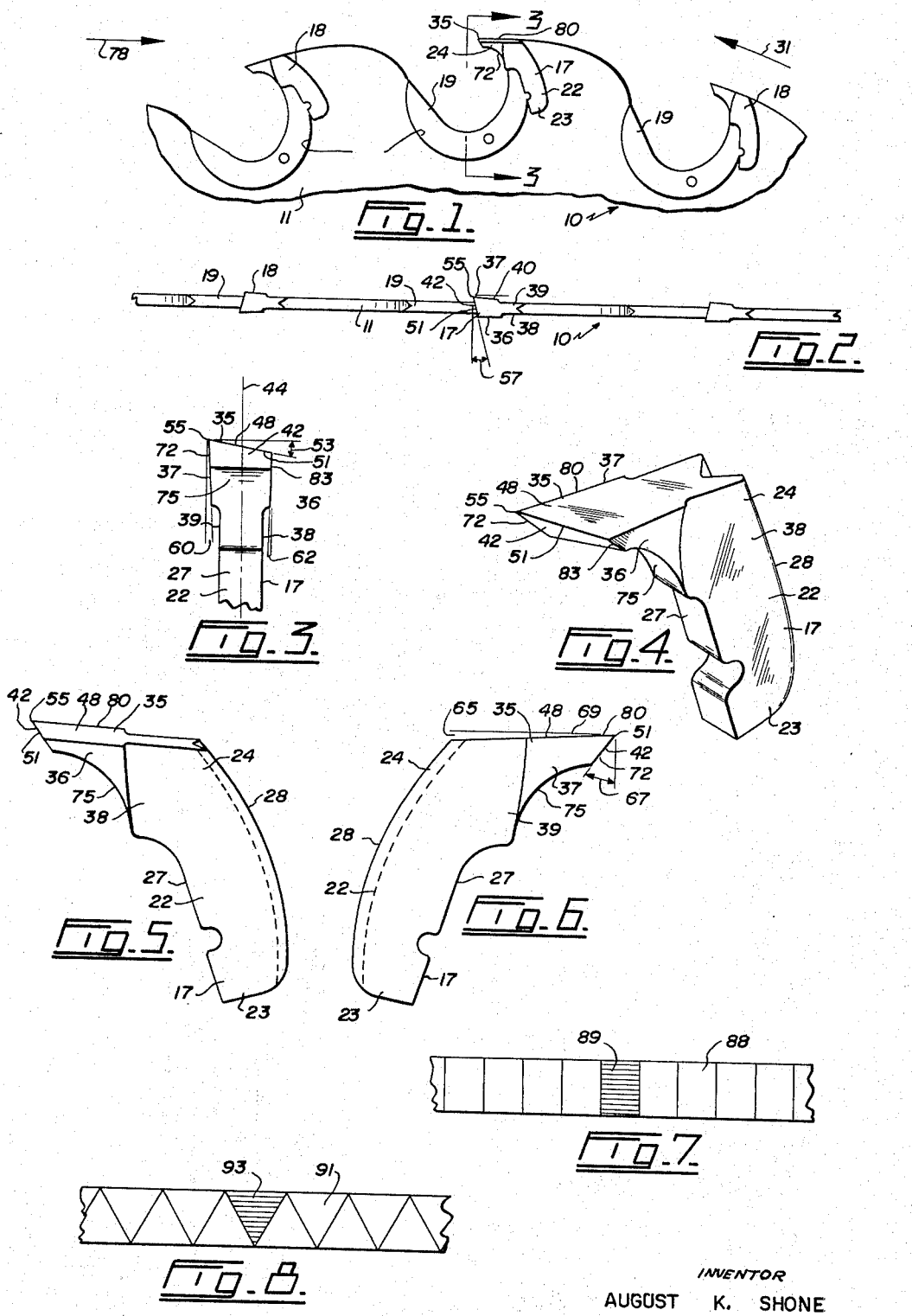
INVENTOR
AUGUST K. SHONE
BY
Fetherstonhaugh & Co.
ATTORNEYS United States Patent Office 3,372,719
Patented Mar. 12, 1968

3,372,719
CIRCULAR SAW AND INSERT TOOTH THEREFOR
August K. Shone, 2115 Cypress St., Vancouver,
British Columbia, Canada
Continuation-in-part of application Ser. No. 476,983,
Aug. 3, 1965. This application July 7, 1966, Ser.
No. 565,050
10 Claims. (Cl. 143—141)

This application is a continuation-in-part of my application filed Aug. 3, 1965, Ser. No. 476,983, now abandoned.

This invention relates to circular saws, and particularly to saws that are used for cutting logs into planks, cants and the like, and to an improved tooth for said saw.

The circular saws mainly contemplated by this invention are the type used for heavy or coarse work and have insertable cutter teeth. With the teeth of the prior art there is great wastage as a result of losses from rough cutting and wide kerfs. The straight chisel cutting action of the prior teeth produces surfaces so coarse or rough that considerable extra wood has to be left on the plank and the like in order to be able to plane them down to the required sizes with smooth surfaces. This overloads the planers, and represents a great loss of wood in shavings as well as sawdust and shreds which have little value. A tooth and saw of the present invention makes a smoother and cleaner cut than the prior saws. It cuts cleanly through the wood with a slicing action so that no "whiskers" are left at the surface of the log through which the saw travels during the cutting operation. Furthermore, the present tooth cuts in a way that produces a substantial volume of small chips or wood kernels instead of slivers and sawdust, said chips or kernels being suitable for the production of pulp in the paper industry.

It is obvious that a tooth that cuts cleanly will either travel through wood faster than one that cuts roughly or tends to shred the wood, or use less power to maintain a desired cutting speed. Therefore, the present saw with the improved tooth also results in a saving of power or in faster cutting.

Some effort in the past has been made to improve the cutting qualities of insertable teeth of circular saws. That these efforts have not been successful is evidenced by the fact that the cutting tooth on the market still has a leading transverse cutting edge which extends straight across the plane of the tooth. This has been in use for many years. Some attempt has been made to provide a transverse cutting edge which is inclined rearwardly across the plane of the tooth. This was attained by filing the forward end of the tooth so that it was inclined rearwardly across the tooth plane. However, this resulted, when the tooth was in operation, in the wood chips being thrown to either side of the tooth and the cutting blade. This developed side thrust at the teeth of the blade resulted in a waste of power and rough cutting. Chips thrown laterally by the cutter abrade the walls of the kerf being cut, and some strike the forward edge of the cutter tooth spaced from the transverse cutting edge thereof and cause undue wear. Occasionally some chips get caught between the side of the tooth and the wall of the kerf, thus further increasing the power wastage of generating heat and roughening of the kerf walls. Furthermore, the angular arrangement of the transverse leading cutting edge of a tooth made according to the prior art often was not sufficient so that a rough chisel effect was attained, or it was too much so that a lateral thrust was caused by this cutting edge and the tooth was weakened by the amount of metal removed in order to attain the angular setting. The grinding of the prior angular teeth is much more complicated than with teeth having their leading cutting edges perpendicular to the planes of the teeth and saw blades.

The standard insertable circular saw cutter tooth commonly used in the past caused considerable damage to the fibres in the chips being removed from the wood. This makes a large percentage of the chips unfit for use in the production of wood pulp, or lowers the value of the chips since the value is dependent to a great extent upon the length of the fibres in the chips.

A tooth according to the present invention has a cutting element with a transverse cutting edge extending from one side of the tooth body to the other angularly in a rearward direction across the body plane. This is attained by providing the cutting element with a forward end perpendicular to the plane of the body of the tooth and inclined rearwardly and inwardly toward said body, and forming a flat outer surface on the cutting element inclined inwardly from a forward edge to a rearward edge thereof. With this arrangement, the junction of the perpendicular forward end and the laterally inclined flat outer surface forms a transverse cutting edge which extends angularly in a rearward direction across the plane of the tooth body. As this forward end is perpendicular to the body plane, the chips produced by the cutting edge are directed by this forwardly inclined forward end towards the centre of the saw blade in which the tooth is inserted so that there is no side thrust produced by this action, the chips are not directed laterally against the kerf walls, and there is very little likelihood of chips getting caught between the sides of the cutting element and the side walls of the kerf. It has also been found that the angle of this transverse cutting edge and the angles of other surfaces of the cutting element are very important in the production of proper cutting action with a minimum of power wastage and a minimum of roughening of the kerf walls. In fact, the walls cut by the present tooth are quite smooth. Another advantage of the present tooth is that it can be sharpened by standard grinders and with standard procedure. This tooth is sharpened in the same manner as the standard teeth now commonly used. The reason for this is that the transverse forward end of the cutting element is perpendicular to the plane of the body of the tooth.

A tooth made in accordance with this invention has a forward end extending perpendicular to the plane of the main body of the tooth. It also includes angular settings of its various faces or surfaces by means of which the best angular setting of the transverse cutting edge is achieved while permitting the use of said forward end perpendicular to the general plane of the tooth. Without a knowledge of the specified ranges of angles, it would be necessary to angle the forward end of the tooth relative to the body plane in order to achieve the desired angle for the transverse cutting edge. Another advantage of this tooth is that the angle of the transverse cutting edge can be set to suit the wood to be cut, various woods requiring different cutting angles, and all of the other angles of the tooth can be set relative to this while retaining the desired perpendicular forward end.

The circular tooth according to the present invention generally conforms to the configuration of the insertable tooth in common use, but the improvements are in the tooth are in the cutting element thereof. The present circular tooth comprises an elongated body adapted to be substantially in the plane of a saw blade and having an inner end to be secured to the blade and an outer end to project from an edge of the blade, said body having forward and rear edges with reference to the direction of movement of the tooth when in operation, and a solid cutting element integral with and on said outer end of the body and projecting forwardly from said outer end to form therewith a gullet, said cutting element projecting generally forwardly beyond the forward edge of the body and spreading laterally in a forward direction from one side of the body beyond the opposite side thereof, said cutting element having a forward end perpendicular to the plane of the body and inclined rearwardly and inwardly towards said body, and a flat outer surface inclined inwardly transversely of the cutting element forming with said perpendicular forward end at the junction therewith a transverse cutting edge extending from said opposite side of the body angularly in a rearward direction across the plane of the body to said one side.

The cutting element of the tooth preferably spreads laterally to project a little on both sides of the body at the transverse cutting edge. It is also preferred to form the cutting element with a side cutting edge extending rearwardly from and beneath the transverse cutting edge at one end of the latter. The side of the cutting element where the side cutting edge is located preferably projects outwardly a little further from the body than the opposite side of said cutting element.

The improved insertable teeth are made as right hand and left hand cutters, and each saw includes a plurality of each of these teeth.

An example of this invention is illustrated in the accompanying drawings, in which, FIGURE 1 is a side elevation of part of a circular saw incorporating the improved cutter teeth, FIGURE 2 is a plan view of the circular saw showing three cutter teeth thereof, FIGURE 3 is an enlarged section taken on the line 3—3 of FIGURE 1, FIGURE 4 is a perspective view of an improved cutter tooth, FIGURE 5 is a side elevation of the tooth, FIGURE 6 is an elevation of the opposite side of the tooth to that shown in FIGURE 5, FIGURE 7 is a diagram illustrating the kerf made by a standard insert tooth saw, and FIGURE 8 is a diagram illustrating the kerf made by a saw incorporating the present teeth.

Referring to the drawings, 10 is a circular saw including a standard blade or disk 11 adapted to be mounted on a power-driven arbor, not shown. The blade has the usual gullets 12 formed therein and opening out through the periphery thereof. A plurality of right hand and left hand insertable cutter teeth 17 and 18 are mounted in or connected to blade 11 in the usual manner by standard keys 19, and project outwardly from the periphery of said blade, there being one tooth at each gullet 12. It will be noted that each cutter tooth is located at an edge of a gullet and projects inwardly over said gullet at the blade periphery, see FIGURE 1, and that the leading or forward edge of said tooth actually helps to form the gullet.

As cutter teeth 17 and 18 are identical, excepting that one is a right hand cutter and the other a left hand cutter, one only, namely tooth 17, will now be described in detail.

Tooth 17 has an elongated body 22 which follows fairly well in standard shape for teeth in this field. The inner end 23 is fixed in blade 11, as shown in FIGURE 1. The outer end 24 projects from the edge of blade 11 in accordance with standard practice. Body 22 has a forward edge 27 and a rear edge 28 with reference to the direction of movement of the tooth when the saw is in operation, said direction being indicated by arrow 31 in FIGURE 1.

A cutting element 35 is formed on or secured to the outer end 24 of body 22, said cutting element projecting from the rear edge 28 generally forwardly beyond the forward edge 27 of the body. Cutting element 35 has side walls 36 and 37 at opposite sides thereof above and spaced laterally outwardly from sides 38 and 39 of body 22, see FIGURES 2 and 3. From FIGURE 2 it will be seen that side wall 36 extends forwardly substantially parallel with the general plane of the tooth and disk 11, while side wall 37 diverges outwardly a little in a forward direction with reference to the direction of movement of the cutter tooth during operation of the saw. In other words, side wall 37 spreads laterally in a forward direction, as indicated by angle 40 in FIGURE 2, and this angle is from about 1 to 3° and for most cases preferably is 3° from the general longitudinal plane of the tooth. Side 37 is preferably located outwardly from the side of body 22 a little further than side wall 36.

Cutting element 35 is formed with a forward end 42 that extends transversely thereof normal to the plane of tooth body 22. This forward end 48 is inclined rearwardly and inwardly towards body 22, although this inclined plane extends in a transverse direction normal to the longitudinal centre line 44, see FIGURE 3, of the tooth and its body 22.

Cutting element 35 is formed with a flat outer surface 48 that is inclined transversely of the tooth from the top of side wall 37 thereof to the top of side wall 36. This transversely inclined outer surface 48 forms at the junction thereof with forward end wall 42 a transverse cutting edge 51. The angle of incline of surface 48 is indicated by the numeral 53 in FIGURE 3, and this angle is usually about 10° to the horizontal, but it may be anywhere from about 3 to 20°. Transverse cutting edge 51 extends angularly in a rearward direction across the plane of body 22, as clearly indicated in FIGURE 2, from a point 55 at the end of the upper edge of wall 37. The angle of cutting edge 51 to a plane extending transversely of the longitudinal plane of tooth body 22 is indicated at 57, and the optimum angle is determined by the species of wood to be cut. The transverse incline of outer surface 48 determines the rearward incline of cutting edge 51, and this may range anywhere from about 9° to 18°, although 15° is an average angle used. If it is desired to change the rearward angle of the transverse cutting edge when a different wood species is to be cut, it is only necessary to grind surface 48 to a transverse incline that will produce the desired rearward incline of the transverse cutting edge.

By referring to FIGURE 3, it will be seen that side wall 37 is inclined downwardly and inwardly relative to the plane of the tooth body, this angle being indicated by numeral 60. This angle may be anywhere from between about 1° to 4°, and usually is about 3°. Side wall 36 is preferably substantially parallel to the longitudinal plane of the tooth, but it can be inclined inwardly slightly in a direction towards the tooth body, as indicated by numeral 62 in FIGURE 3. This angle may be from 0° up to about 1°.

Outer surface 48 is preferably inclined rearwardly and inwardly towards body 22 in a rearward direction from transverse cutting edge 51, this angle being indicated by the numeral 65 in FIGURE 6. It is difficult to define this angle, as well as the angle of inward incline of forward end 42 of the cutting element, the angle of the latter being indicated by numeral 67 in FIGURE 6. As angles 65 and 67 are very important and relative to the cutting action of the tooth, these angles are measured from a tangent to the circular path along which tip 55 of the cutting element travels when blade 11 rotates during operation of the saw. This tangent is indicated by line 69 in FIGURE 6. Angle 65, indicating the rearward incline of surface 48, is from about 2° to 8° from the tangent, and usually is about 3°. The angle of forward end 42 from the tangent at any longitudinal plane cutting through said end is from about 22° to 45°, and is usually about 38°.

Forward end 42 meets side wall 37 beneath tip 55 to form a side cutting edge 72 which is inclined rearwardly and inwardly towards body 22 from said point 55. As side cutting edge 72 follows the rearward incline of forward end 42, the angle of this side cutting edge is from about 22° to 45°.

Cutting element 35 extends forwardly from body 22 to form a gullet 75 beneath said cutting element, said gullet merging into gullet 12 of blade 11, as shown in FIGURE 1.

As tip 55 and side wall 37 of cutter tooth 17 are located on the right side of said tooth with reference to the direction of the saw, this is a right cutter, whereas point 55 of tooth 18 is on the left side of the saw and therefore this tooth is a left cutter.

During operation, blade or disk 11 is rotated in the direction of arrow 31 of FIGURE 1, and the wood being cut is moved in the direction of arrow 78. During this action, point 55 and transverse cutting edge 51 of each cutter tooth cuts into the wood along the bottom of the kerf in the latter, and side cutting edge 72 cuts the wood along the side of the kerf to free the piece of wood at the bottom thereof being cut therefrom by edge 51. The bevelled forward end 42 of the cutting element directs the cut-away wood or chips into gullet 12 and away from the cutting edges. As end 41 is perpendicular to the longitudinal plane of the cutter tooth, the chips are directed straight into the gullet and not laterally towards the sides of the kerf. Thus, the chips do not abrade the side walls of the kerf nor the wall of gullet 75 of the tooth.

With the angles mentioned above, the angular arrangement of cutting edges 51 and 72 and of the forward end of longitudinal edge 80 formed by outer surface 48 and side wall 37 at the top of the latter, is such that tooth 17 cuts through the wood very cleanly. The particles of wood are cut away from the main body thereof and not torn or shredded therefrom at any place. Cutting edges 42 and 45 and the forward end of the longitudinal edge 80 become dull adjacent point 55 after considerable use. In order to restore the full cutting action of the tooth, it is only necessary to grind or file forward end 42. As this forward end extends straight across the cutting element, it can be ground by standard equipment and technique.

It will be noted that side cutting edge 72 is located outwardly relative to body 22 farther than edge 83 at the opposite side of the tooth and formed by end 42 and side wall 36. Thus, side cutting edge 72 runs along one side of the kerf, while edge 83 is clear of the opposite side thereof, said opposite side being cut by the side cutting edge 72 of the tooth ahead of the one under consideration. This keeps friction down to a minimum, and allows air to flow along the side of cutting element 35 adjacent edge 83 and side wall 36 to keep said cutting element relatively cool.

FIGURES 7 and 8 illustrate in part the difference and the advantage of the present cutter tooth over a typical insert tooth for a circular saw.

FIGURE 7 represents the bottom of a kerf 88 made by an ordinary insert tooth. The standard teeth act like chisels in chopping directly across the grain of the wood. The shaded area 89 represents the shape and the amount of bite taken by a tooth, and the direction of the lines in this shaded area represents the grain direction of the wood.

FIGURE 8 represents the bottom 91 of a kerf made by a cutter tooth 17 or 18. The transverse cutting edges 51 of the alternates left and right hand teeth have a slicing action, each tooth cutting out a piece of wood 93 which is substantially V-shaped.

It is known generally that more force is required to make a chisel cut at right angles to the grain of the wood than at an angle less than 90°, and that inclination of the cutting edge will provide a slicing action which will reduce the required cutting force. Although the volume of wood removed by one ordinary insert tooth and by one tooth 17 or 18 may be the same, the kernels or chips produced by the latter are superior to the former as a source of fibre for pulp as there is a greater portion of undamaged and uncut fibres in said latter chips. Actual tests have shown that the recovery and strength properties are higher for pulp produced from kerf material cut by an insert tooth made in accordance with the present invention than from an ordinary insert tooth in common use today on the market.

As previously stated, the ideal angle for cutting edge 51 of the cutter tooth is dictated by the species of wood to be cut. With the ranges of the angles of the various surfaces of the tooth set out above, the angle of cutting edge 51 can be set at the ideal angle from the wood to be cut, and then angles 53, 65 and 67 as well as the other angles can be determined within the specified ranges to enable forward end 42 to extend transversely of the cutting element of the tooth normal to the plane of the tooth body.

What I claim as my invention is:

1. A tooth for a circular saw, comprising an elongated body adapted to be substantially in the plane of a saw blade and having an inner end to be secured to the blade and an outer end to project from an edge of the blade, said body having forward and rear edges with reference to the direction of movement of the tooth when in operation, and a solid cutting element integral with and on said outer end of the body and projecting forwardly from said outer end to form therewith a gullet, said cutting element projecting generally forwardly beyond the forward edge of the body and spreading laterally in a forward direction from one side of the body beyond the opposite side thereof, wherein the said portion of the element which projects laterally stabilizes the saw as the teeth cut a path for an object which path is greater in width than the body of the saw blade, said cutting element having a forward end perpendicular to the plane of the body and inclined rearwardly and inwardly towards said body, and a flat outer surface inclined inwardly transversely of the cutting element forming with said perpendicular forward end at the junction therewith a transverse cutting edge extending from said one side of the body angularly in a forward direction across the plane of the body to a side cutting edge beyond said opposite side, said side cutting edge extending rearwardly from and beneath said transverse cutting edge.

2. A saw tooth as claimed in claim 1 in which the side cutting edge is inclined inwardly towards the plane of the tooth body.

3. A saw tooth as claimed in claim 1 in which said flat outer surface is inclined rearwardly from the transverse cutting edge towards the tooth body.

4. A tooth for a circular saw, comprising an elongated body adapted to be substantially in the plane of a saw blade and having an inner end to be secured to the blade and an outer end to project from an edge of the blade, said body having forward and rear edges with reference to the direction of movement of the tooth when in operation, and a solid cutting element integral with and on said outer end of the body and projecting forwardly from said outer end to form therewith a gullet, said cutitng element projecting generally forwardly beyond the forward edge of the body and spreading laterally in a forward direction from first and second sides of the body, wherein the said portions of the element which project laterally on both sides of the said body stabilize the saw as the teeth cut a path through an object which path is greater in width than the body of the saw blade, said cutting element having a forward end perpendicular to the plane of the body and inclined rearwardly and inwardly towards said body, and a flat outer surface inclined inwardly transversely of the cutting element forming with said perpendicular forward end at the junction therewith a transverse cutting edge extending forwardly angularly across the plane of the body to a side cutting edge beyond said first side of the body, said cutting element at the transverse cutting edge being a little wider towards the first side of the body than towards said second side thereof, said side cutting edge extending rearwardly from and beneath said transverse cutting edge.

5. A saw tooth as claimed in claim 1 in which the transverse cutting edge is inclined rearwardly from about 9 to 18° from a transverse plane normal to the plane of said body.

6. A saw tooth as claimed in claim 4 in which the side of the cutting element at said first side of the body slopes inwardly in the direction of the body from about 1 to 4° and the side of the cutting element at said second side of the body slopes inwardly in the direction of the body from about 0 to 1°.

7. A saw tooth as claimed in claim 1 in which said flat outer surface is inclined inwardly transversely of the cutting element about 3 to 20°.

8. A saw tooth as claimed in claim 1 in which said cutting element spreads laterally in a forward direction beyond said opposite side about 1 to 3°.

9. A saw tooth as claimed in claim 1 in which said transverse cutting edge travels along a circular path during operation of the circular saw to which said body is secured, and said flat outer surface is inclined rearwardly from the transverse cutting edge towards the tooth body at an angle of from about 2 to 8° from a tangent to said circular path at the transverse cutting edge.

10. A saw tooth as claimed in claim 1 in which said transverse cutting edge travels along a circular path during operation of the circular saw to which said body is secured, and the rearward incline of said forward end is from about 22 to 45° from a tangent to said circular path at the transverse cutting edge.

References Cited

UNITED STATES PATENTS 2,528,226   10/1950   Hildebrant _____ 143—133

FOREIGN PATENTS 690,452   7/1964   Canada.

DONALD R. SCHRAN, *Primary Examiner.*